Dec. 29, 1959  H. R. SCHELP  2,918,787
ENGINE SUPERCHARGING APPARATUS
Filed Sept. 19, 1955
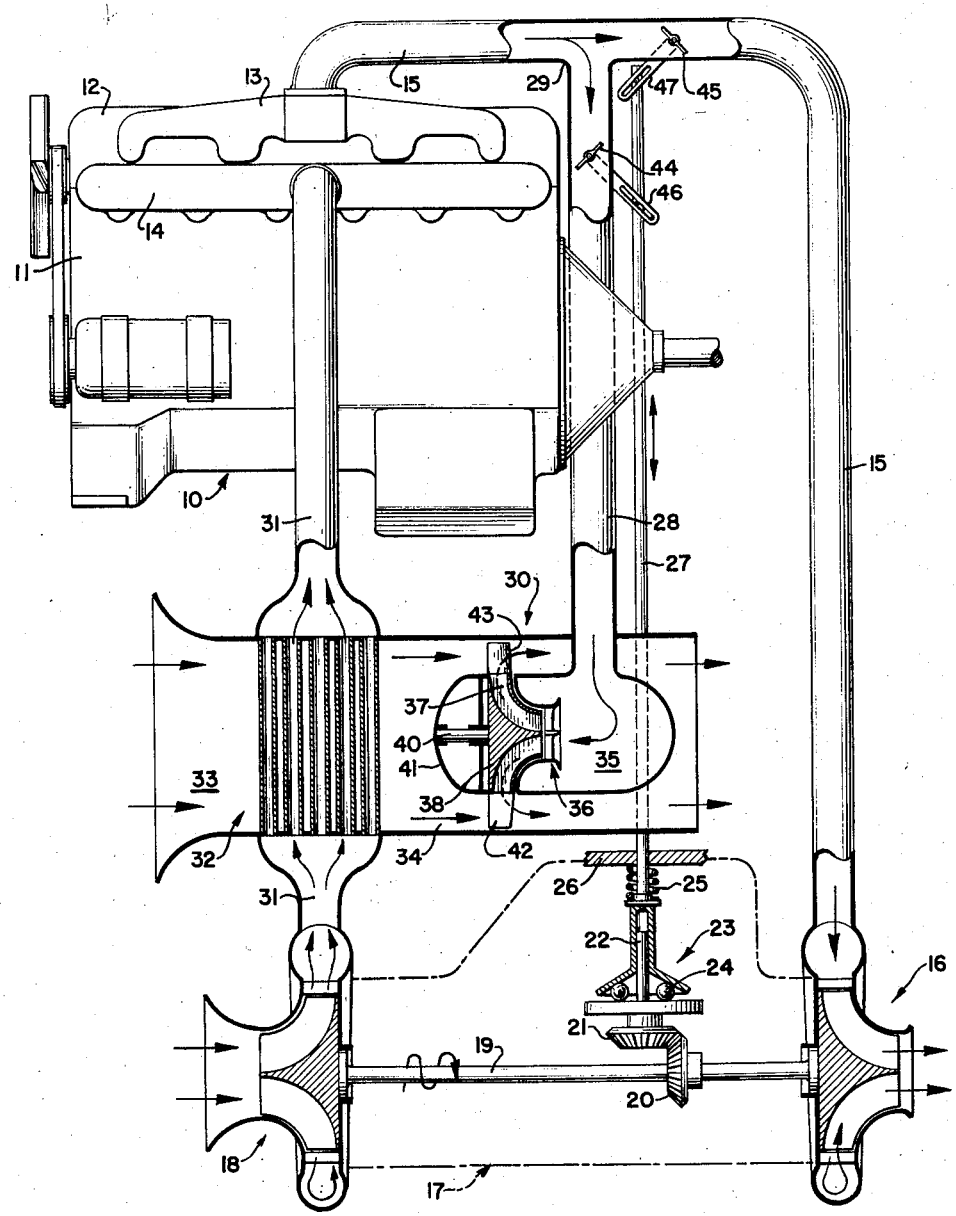
HELMUT R. SCHELP,
INVENTOR.
BY John H. H. Wallace

United States Patent Office 2,918,787
Patented Dec. 29, 1959

2,918,787

ENGINE SUPERCHARGING APPARATUS

Helmut R. Schelp, Pacific Palisades, Calif., assignor to The Garrett Corporation, Los Angeles, Calif., a corporation of California Application September 19, 1955, Serial No. 535,058

7 Claims. (Cl. 60—13)

The present invention relates generally to an engine supercharging device, and relates more specifically to an engine supercharging device having means for effecting control of the density of induction air supplied to an engine by such device.

In many types of engines, such as, for example, diesel engines employed in prime movers, and the like, it has been found desirable to utilize turbosupercharging machinery for the delivery of compressed induction air to the engine. However, in order that the pressure ratio of the induction air may be raised to a level commensurate with efficient operation of such engines, it is necessary that the density of the induction air be kept at a high level. When utilizing exhaust turbine driven compressors to provide induction air, decreased density is generally experienced due to the heating of such air during compression. Additionally, in some instances, it is necessary to operate the turbosupercharging machinery in areas of rarefied atmosphere, such a condition reducing the effective load on the air compressor and thus permitting the driving turbine for such a compressor to increase speed beyond that which the turbine was designed for efficient operation thereof. In such instances, it has long been the practice to bypass a portion of the engine exhaust gases through a suitable waste gate, in response to an increased speed of the turbosupercharger thereby to reduce the speed of the machine and thus to maintain this speed to an optimum design point. While this maintenance of optimum speed provided for efficient operation of the turbosupercharger, control of the air density has been substantially neglected, due, in part, to the complex mechanisms heretofore associated with such density control. Moreover, prior mechanisms for controlling the density of induction air delivered from a turbosupercharger have either required additional power for the operation thereof or have been ineffective at or during various operating conditions.

Accordingly, it is one important object of the present invention to provide a turbosupercharging mechanism having means for controlling air density, such means embodying features of novelty designed to overcome the aforementioned difficulties and disadvantages of prior devices.

It is another important object of the present invention to provide novel means whereby excess energy in exhaust gas, normally lost through the waste gate of a turbosupercharger, is employed to effect an increased density of the induction air being supplied to an engine.

It is a further important object of the present invention to provide a supercharging device with a means for controlling the density of air delivered therefrom, and wherein such density control means is of a character permitting separate modulation thereof in order that the induction air pressure ratio may be maintained at as high a level as practical.

It is still another object of the present invention to provide novel means for effecting cooling of induction air being supplied to an engine by a turbosupercharger, and to increase such cooling in response to an unloading responsive overspeed of the turbosupercharger and/or a reduction in the density of the induction air.

A further object of the present invention is to provide a turbosupercharger with means to utilize normally wasted energy in exhaust gases to effect cooling of induction air being delivered to an engine from the turbosupercharger.

Other and further important objects of the present invention will become apparent from the disclosures in the following detailed specifications, appended claims and accompanying drawing wherein:

The single figure in a schematic view of the turbosupercharger of the present invention, together with the associated controls utilized therewith, as shown in combination with a suitable reciprocating engine.

With reference to the drawing, the turbosupercharging apparatus of the present invention is shown as being utilized with a suitable internal combustion engine indicated generally at 10. While the engine 10 is shown as being generally of the reciprocating diesel type, as may be utilized for various types of installations, both mobile and stationary, it is to be understood, of course, that the present invention may be applied to other types of engines without departing from the spirit and scope thereof.

The particular engine 10, utilized in connection with the disclosure herein, comprises the usual cylinder block 11 and head 12, together with an exhaust manifold 13 and an intake manifold 14. Hot exhaust gases from the manifold 13 are adapted to be delivered therefrom through an exhaust passage or conduit 15, and normally to an expansion turbine, indicated generally at 16, which is associated with a turbosupercharger unit indicated generally at 17.

The turbosupercharger 17 further comprises a compressor, indicated generally at 18, such compressor being adapted to be driven by a shaft 19 interconnecting the turbine 16 and the compressor 18. A bevel gear 20, fixed to the shaft 19, is adapted to drive a matching bevel gear 21, the gear 21 being secured on one end of a stub shaft 22. The shaft 22 is associated with a conventional flyball governor 23 having flyballs 24 which are biased in a direction to force the balls 24 inwardly toward the shaft 22 by means of a compression spring 25, which bears against a fixed base structure or portion of the turbosupercharger casing 26. The outer conical portion of the governor 23 is provided with an upwardly extending portion 27, the purpose of which will be hereafter more fully described.

As shown in the drawing, a bypass conduit or passage 28 is adapted to communicate with the conduit 15, as at 29, and extends to a turbine driven fan unit indicated generally at 30.

A passage structure 31 is provided between the outlet of the compressor 18 and the entrance to the intake manifold 14, for conducting compressed induction air to the induction system of the engine 10. A heat exchanger 32 is disposed in the passage 31, there being a passage 33 for conducting atmospheric air into heat exchange relationship with the induction air passing through the conduit 31. The passage 33 is extended beyond the heat exchanger 32 with a portion 34 thereof being adapted to house the turbine driven fan unit 30.

The fan unit 30 may be of the type disclosed in Patent No. 2,701,682 issued to Frederich Dallenbach and Helmut R. Schelp, February 8, 1955, entitled Rotojet Impeller, commonly termed a "rotojet" fan. The rotojet fan utilized herewith is shown schematically and comprises generally a plenum chamber 35 which communicates with the passage 28 and provides a reception area for exhaust gases delivered thereto through the bypass passage 28. From the chamber 35, the exhaust gases are conducted through a stationary nozzle structure 36 and through a plurality of channels formed between blades 37 carried by a shrouded rotor 38. The rotor 38 is mounted on a shaft 40 which is journaled in suitable bearings in one portion 41 of the rotojet fan unit housing. Additionally, the blades 37 form a diffuser or turbine and may be circumferentially curved for this purpose. The periphery of the rotor 38 carries a plurality of fan blades 42 which extend beyond the outer surface of the fan unit housing 41 with the outer ends thereof positioned in close proximity to the wall of the atmospheric air duct portion 34. The blades 42 are provided with hollow interiors which communicate with the passages between the blades 37 of the rotor 38, and have rearwardly directed openings 43 along the trailing edges thereof. Thus, exhaust gases entering the plenum chamber 35 pass through the stationary nozzle 36, flow into the diffuser channels formed between the blades 37 and enter the hollow interiors of the blades 42 thereafter to be discharged from the openings 43 in the trailing edges of the blades 42. In other words, the fan blades 42 are driven by means of the reactive forces of the exhaust gases passing through the rotor 38 and by jet reaction in the passage of the gases outwardly through the trailing edge openings 43 in the blades 42.

It may thus be seen that means are provided to effect passage of atmospheric air through the heat exchanger 32 in response to flow of excess or normally wasted exhaust gases from the engine 10. It may also be seen that no mechanical connection exists between the engine 10 and the fan unit 30, so that modulation of the unit 30 may be accomplished irrespective of speed or other operating conditions of the engine 10.

Valve means, comprising a butterfly type valve 44, disposed in the bypass passage 28, and a butterfly type valve 45, disposed in the passage 15 downstream from the junction point 29 of the passages 15 and 28, are operated by the shaft extension 27 by means of levers 46 and 47, respectively. The valves 44 and 45 are arranged in conjunction with the levers 46 and 47 and the shaft extension 27 in a manner permitting one of these valves to be open while the other valve is closed, there being a full range of modulation by means of these valves between such extreme positions. In this connection, it is to be understood that various types of valve arrangements designed to accomplish the particular purpose desired herein, may be utilized without departing from the spirit and scope of this invention.

At rest and under normal operating conditions of the turbosupercharger 17, the valve 44 will be closed and the valve 45 will be open by action of the compression spring 25, thereby permitting the entire gaseous exhaust from the engine 10 to be delivered through the conduit 15 to the turbine to effect its operation. This condition also exists during operation of the engine 10 at low load conditions. Accordingly, the turbine 16 will act to drive the compressor 18 to provide induction air through the conduit 31 to the intake manifold 14 of the engine 10. In a fixed installation situation, heating of the induction air, due to compression thereof, will result in a reduced density of such air, thus reducing the back pressure induced loading on the compressor 18. Inasmuch as little, if any, atmospheric air is passed through the passage 33 into the heat exchanger 32 during low load engine conditions in fixed installations, the compressed induction air will experience only a small amount of cooling in passage through the heat exchanger 32. When in situations where the ambient atmospheric air is at a low density, the load on the compressor 18 will also be reduced. Also, when high loads are applied to engine 10, the temperature of the exhaust gases increase, thus providing more energy to the turbine. This results in an increased speed of the turbine 16 and shaft 19 thus to actuate the governor 23 and cause the valve 44 partially to open and the valve 45 partially to close to modulating positions. With these valves so positioned, the exhaust gases in the passage 15 will be bypassed into the passage 28 and delivered thereby to the plenum chamber 35 of the rotojet fan unit 30. As described hereinbefore, the pasage of exhaust gases through the fan unit 30 will cause rotation of the blades 42, thus to draw cooling atmospheric air through the passage 33, and portion 34 thereof, and through the heat exchanger 32. The valves 44 and 45 will thereafter be positioned in accordance with the speed of the turbosupercharger 17.

Naturally, in mobile installations, greater cooling will be experienced in the passage of the induction air through the heat exchanger 32, due to the effect of the passage of ram atmospheric air through the heat exchanger. In such instances, a greater percentage of the exhaust gases will be transmitted through the conduit 15 to the turbine 16 with a smaller percentage of the exhaust gases being delivered through the bypass conduit 28.

In accordance with the present invention, it will be seen therefore, that normally wasted engine exhaust gases, which, in prior systems would be lost through the waste gate in controlling the speed of the turbosupercharger, are herein utilized to drive the fan blades 42 of the rotojet fan unit 30, thereby to effect increased cooling of the induction air being delivered through the conduit 31. This cooling is accomplished by passing the hot compressed induction air in heat exchange relationship with cooler ambient atmospheric air through the heat exchanger 32 with an increased amount of ambient atmospheric air being drawn through the heat exchanger by means of the rotojet fan unit 30. In other words, the cooling of the induction air permits an increase in the density thereof and greater mass flow to the intake manifold 14, this action taking place at the most advantageous time depending largely upon the temperature of the ambient atmospheric air, or upon the density of the ambient atmospheric air due to various altitude conditions under which the device of the present invention may be operated.

Furthermore, it is to be noted that one important advantage of the device of the present invention is the arrangement of the rotojet fan unit 30 in the ambient atmospheric passage 33, and portion 34 thereof, and the non-mechanical connection between the fan unit and the engine 10. Accordingly, separate modulation, or control of the speed of the rotojet fan, may be utilized without concern for engine operating conditions or speeds. Additionally, as larger engines require increased compression ratios, it is necessary that the density of the induction air be maintained at as high a limit as possible. With density being the function of pressure and temperature, it is evident that reducing the temperature of the induction air serves to raise the density thereof. In the device of the present invention, this cooling of induction air is accomplished, even in fixed installations, without the need for parasitic power bleed from the engine being supercharged.

It is to be noted that the power for operation of the rotojet fan unit 30 becomes most readily available during the periods of high load operation of the engine 10 and when highest density induction air is required, thus effecting the most desirable operating conditions for the engine.

Having thus described the invention and the present embodiment thereof, it is desired to emphasize the fact that many modifications may be resorted to in a manner limited only by a just interpretation of the following claims.

I claim:

1. An engine supercharging device comprising, in combination: an engine exhaust driven turbosupercharger; a passage for delivering compressed air from said turbosupercharger to an induction system of an engine; a heat exchanger disposed in said passage; means for passing atmospheric air through said heat exchanger in heat exchange relationship with said compressed air; an exhaust passage for conducting engine exhaust gases to said turbosupercharger; a bypass passage communicating with said exhaust passage; means for controlling exhaust gas flow through said bypass passage, said controlling means being responsive to a predetermined speed of said turbosupercharger; and means operated by energy removed from the exhaust gases delivered to said bypass passage for effecting an increased flow of atmospheric air through said heat exchanger.

2. An engine supercharging device comprising, in combination: an engine exhaust driven turbosupercharger; a passage for delivering compressed air from said turbosupercharger to an induction system of an engine; a heat exchanger disposed in said passage; means forming a passage to conduct atmospheric air through said heat exchanger in heat exchanger relationship with said compressed air; an exhaust passage for conducting engine exhaust gases to said turbosupercharger; a bypass passage communicating with said exhaust passage; means for controlling exhaust gas flow through said bypass passage, said controlling means being responsive to a predetermined speed of said turbosupercharger; a fan positioned in said atmospheric passage; and means operated by energy removed from the exhaust gases for driving said fan to effect an increased flow of air through the atmospheric air passage of said heat exchanger.

3. An engine supercharging device comprising, in combination: an engine exhaust driven turbosupercharger; a passage for delivering compressed air from said turbosupercharger to an induction system of an engine; a heat exchanger disposed in said passage; means forming a passage for conducting atmospheric air through said heat exchanger in heat exchange relationship with said compressed air; an exhaust passage for conducting engine exhaust gases to said turbosupercharger; a bypass passage communicating with said exhaust passage; valve means in said exhaust and bypass passages; means responsive to the speed of said turbosupercharger for controlling the position of said valve means; and air propelling means driven by energy removed from the exhaust gases delivered through said bypass passage for effecting an increased flow of atmospheric air through said heat exchanger.

4. An engine supercharging device comprising, in combination: an engine exhaust driven turbosupercharger; a passage for delivering compressed air from said turbosupercharger to an induction system of an engine; a heat exchanger disposed in said passage; means forming a passage for conducting atmospheric air through said heat exchanger in heat exchange relationship with said compressed air; an exhaust passage for conducting engine exhaust gases to said turbosupercharger; a bypass passage communicating with said exhaust passage; valve means in said exhaust and bypass passages; governor means driven by said turbosupercharger for controlling the position of said valve means in response to a predetermined speed of said turbosupercharger; a fan positioned in said atmospheric air passage; and means operable by energy removed from the exhaust gases of said engine to drive the fan and increase the flow of air through the atmospheric air passage of said heat exchanger.

5. A reciprocating engine supercharging device comprising, in combination: an engine exhaust driven turbosupercharger having a turbine and a compressor driven by said turbine; a passage interconnecting the discharge from said compressor and the induction system of an engine; a heat exchanger disposed in said passage; a ram air passage disposed in communication with said heat exchanger to conduct atmospheric air through said heat exchanger in heat exchange relationship with said compressed air; an exhaust passage for conducting engine exhaust gases to said turbine of said turbosupercharger; a turbine driven fan positioned in said ram air passage; a bypass passage interconnecting said exhaust passage and said turbine driven fan; valve means positioned intermediate said exhaust passage and said bypass passage; a governor operably connected with and driven by said turbosupercharger; and linkage means interconnecting said governor and said valve means for operating the latter to divert a portion of said exhaust gases through said bypass passage in response to a predetermined speed of said turbosupercharger to effect an increased flow of atmospheric air through the ram air passage of said heat exchanger.

6. In a supercharging device for an engine having an air induction system and an exhaust system associated therewith: an engine exhaust driven turbosupercharger formed for communication with the exhaust system and induction system of the engine; means between the compressed air outlet of said supercharger and the air induction system of the engine for passing ambient atmospheric air into heat exchange relationship with the compressed air from the supercharger; an engine exhaust driven turbofan formed for communication with the exhaust system of the engine, said turbofan being provided to induce the flow of ambient atmosphere through said heat exchange means; valve means for controlling the flow of exhaust gases from the engine to said supercharger and said fan; and means responsive to the speed of operation of one of said turbo devices for actuating said valve means to simultaneously increase exhaust gas flow to one and decrease exhaust gas flow to the other.

7. In a supercharging device for an engine having air induction and exhaust gas systems associated therewith: an exhaust gas driven turbosupercharger having turbine and compressor portions formed for communication with the exhaust and induction systems, respectively, of the engine; means between the outlet of the compressor portion and the air induction system of the engine for passing compressed air from the supercharger through heat exchange relationship with air at ambient temperature; means formed for communication with the exhaust gas system of the engine and operated by exhaust gases to increase the flow of ambient air through said heat exchange means; and means operative in response to changes in speed of said turbosupercharger to inversely vary the flow of exhaust gases from the engine to the turbine portion of said supercharger and said ambient air flow increasing means.

References Cited in the file of this patent

UNITED STATES PATENTS

| | | |
|---|---|---|
| 1,410,726 | Schoonmaker | Mar. 28, 1922 |
| 2,474,018 | Sparrow | June 21, 1949 |
| 2,518,660 | Browne | Aug. 15, 1950 |
| 2,558,797 | Thiess | July 3, 1951 |
| 2,571,256 | King | Oct. 16, 1951 |

FOREIGN PATENTS

| | | |
|---|---|---|
| 231,156 | Great Britain | Sept. 10, 1926 |
| 467,423 | Great Britain | June 16, 1937 |